United States Patent [19]

Brown et al.

[11] Patent Number: 5,605,056
[45] Date of Patent: Feb. 25, 1997

[54] PORTABLE COOLER WITH SUSPENDED GRATE FOR ICE-FREE STORAGE AREAS

[75] Inventors: Albert C. Brown; Matthew K. Starling, both of Savannah, Ga.

[73] Assignee: Cooler Ideas, Inc., Savannah, Ga.

[21] Appl. No.: 533,613

[22] Filed: Sep. 25, 1995

[51] Int. Cl.⁶ ........................................................ F25D 3/08
[52] U.S. Cl. ........................ 62/457.4; 62/459; 62/457.2; 62/529; 43/55; 312/210
[58] Field of Search ................................... 62/371, 457.1, 62/457.2, 457.7, 457.9, 459, 464, 529, 530, 440, 457.4, 457.5; 312/210, 210.5, 357; 43/55

[56] References Cited

U.S. PATENT DOCUMENTS

| | | |
|---|---|---|
| 1,739,017 | 12/1929 | Ross .................................................... 62/529 |
| 2,243,498 | 5/1941 | Candioto . |
| 2,935,858 | 5/1960 | Kingery . |
| 3,835,575 | 9/1974 | Kelley et al. . |
| 4,128,170 | 12/1978 | Elliott . |
| 4,927,041 | 5/1990 | Hepburn . |
| 5,010,681 | 4/1991 | Cox, Jr. . |
| 5,050,526 | 9/1991 | Nelson et al. . |
| 5,123,198 | 6/1992 | Von Grossmann . |
| 5,231,789 | 8/1993 | Radmanovich . |
| 5,305,544 | 4/1994 | Testa, Jr. . |
| 5,319,877 | 6/1994 | Hagan . |
| 5,481,823 | 1/1996 | Hoover et al. . |

*Primary Examiner*—John M. Sollecito
*Attorney, Agent, or Firm*—Dorn, McEachran, Jambor & Keating

[57] ABSTRACT

A portable cooler for use with fish bait, as well as food and beverage, includes a housing having an insulated bottom, side walls, and a pivotal top hinged to one of the side walls. There is a support positioned within the housing with the support having side walls and a bottom. There is a space for ice defined between a plurality of the housing side walls and a plurality of the support side walls. There are a plurality of drawers movable in the support and accessible from outside of one of the housing side walls. Each drawer includes a front, side walls, and a bottom, at least one of the drawers having a grate supported on the side walls above the drawer bottom, the space beneath the grate and above the drawer bottom providing a container for ice to cool articles positioned on the grate, but to keep the articles spaced from the ice positioned beneath the grate.

12 Claims, 4 Drawing Sheets

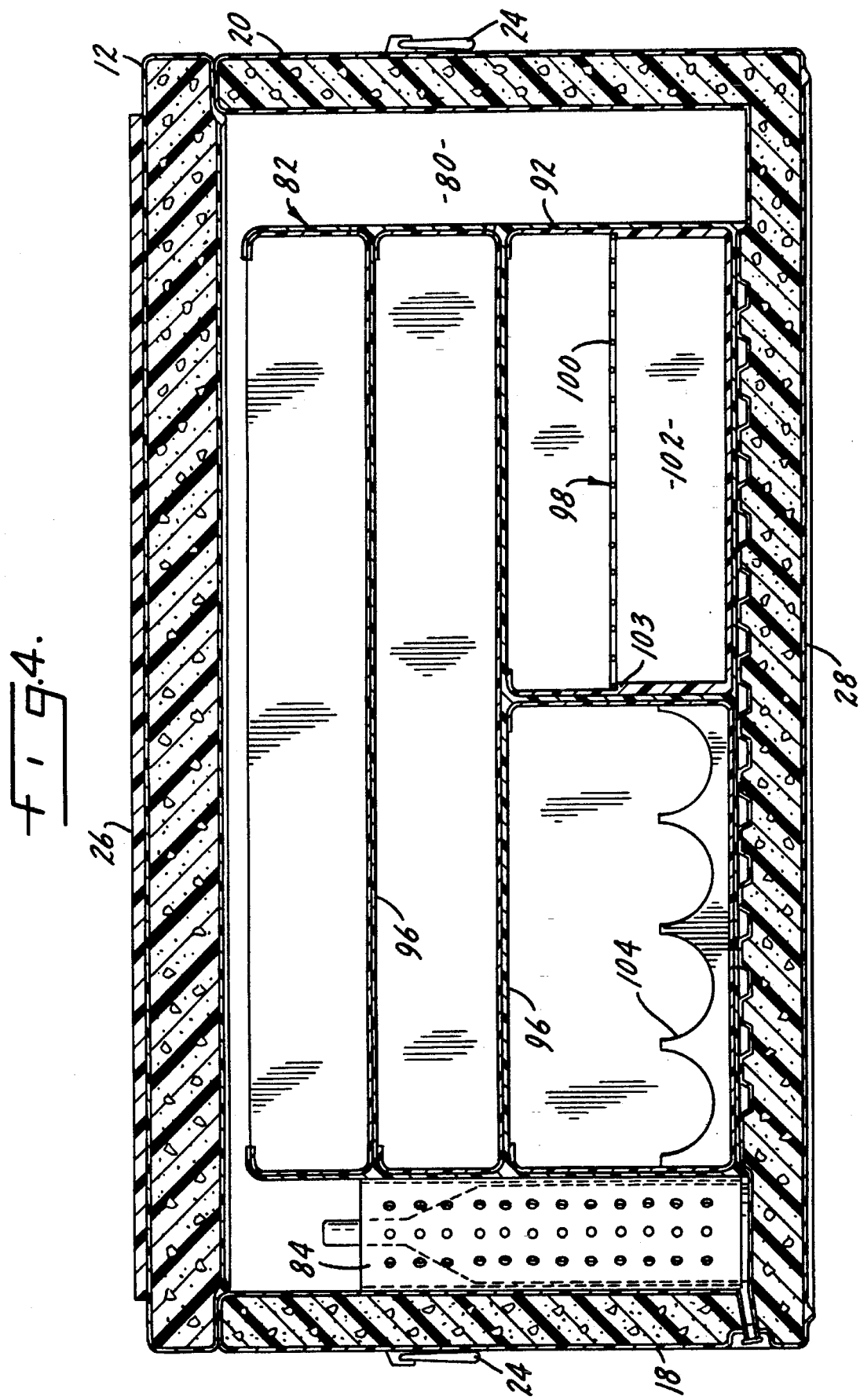

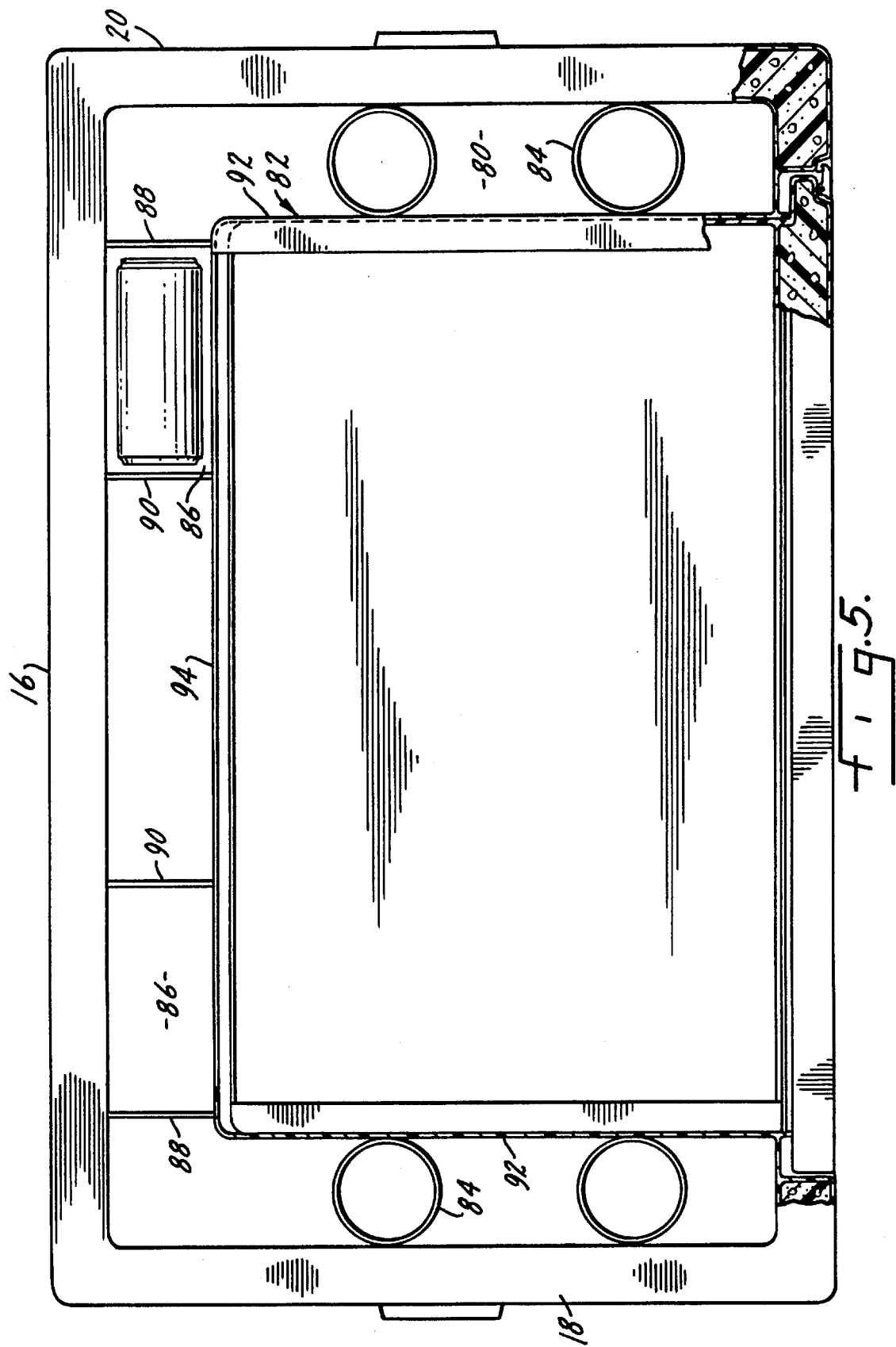

PORTABLE COOLER WITH SUSPENDED GRATE FOR ICE-FREE STORAGE AREAS

THE FIELD OF THE INVENTION

The present invention relates to portable coolers of the type customarily used with fish bait, beverages, or foods such as are commonly found in a picnic or boating environment. A particular problem of coolers of this type is that the cooler is generally open and beverage containers and food in plastic bags and fish bait may be positioned within the cooler, but are in contact with the ice or other coolant material within the cooler. The ice will contaminate fish bait, rendering it so soggy as to be largely unusable. The ice, melting as it will over a period of time, may well render soggy the foodstuffs which are within the cooler. The invention solves the problem of ice contamination within a cooler by isolating the ice from the material being cooled. The ice is in a peripheral compartment about a central support, with the support having drawers, some of which are accessible through a side wall of the cooler, with the top drawer being accessible through the pivotal open lid of the cooler. One or more of the drawers may include a lift-out tray, with the bottom of the tray being formed by a grate. The space in the drawer above the drawer bottom and beneath the grate may contain ice, but whatever is positioned on the grate, such as fish bait, food, or the like is cooled by the ice, but clearly spaced above the ice itself and the water which will naturally form over time as the ice melts.

SUMMARY OF THE INVENTION

The present invention relates to coolers of the type used for fish bait, beverages, and food materials, and particularly to such a cooler which separates the ice from the material being cooled.

A primary purpose of the invention is a cooler of type described, usable for example with fish bait, which has the fish bait in close proximity to the ice which is cooling it, but isolated from the ice by a grate.

Another purpose is a cooler of the type described which has a plurality of drawers mounted within a support, with the area about the support forming an ice depository, with the support separating the ice from the material within in it.

Another purpose is a cooler of the type described including a plurality of drawers for fish bait, beverages, or foodstuffs, with one or more of the drawers having a lift-out tray, with the bottom of the tray being formed by a grate which separates the material being cooled from the ice within the drawer.

Another purpose is a cooler of the type described including a cutting board on the top thereof.

Other purposes will appear in the ensuing specification, drawings and claims.

BRIEF DESCRIPTION OF THE DRAWINGS

The invention is illustrated diagrammatically in the following drawings wherein:

FIG. 4 is a vertical section through a second embodiment of cooler using the concepts disclosed herein, and FIG. 5 is a top view, in part section, with the top removed, of the cooler of FIG. 4.

DESCRIPTION OF THE PREFERRED EMBODIMENT

Figure 1:
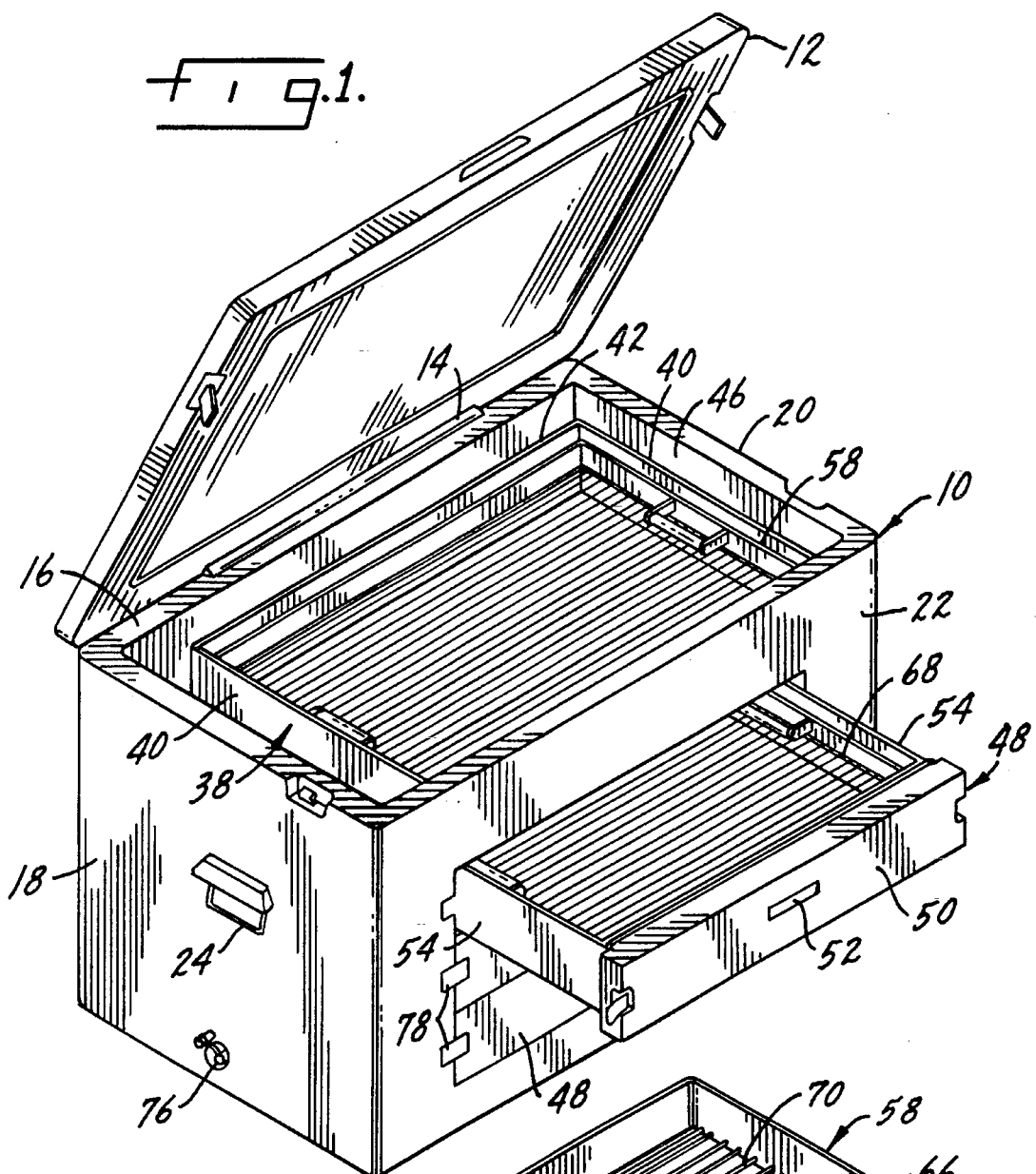
FIG. 1 is a perspective of one embodiment of the cooler of the present invention.
Figure 2:
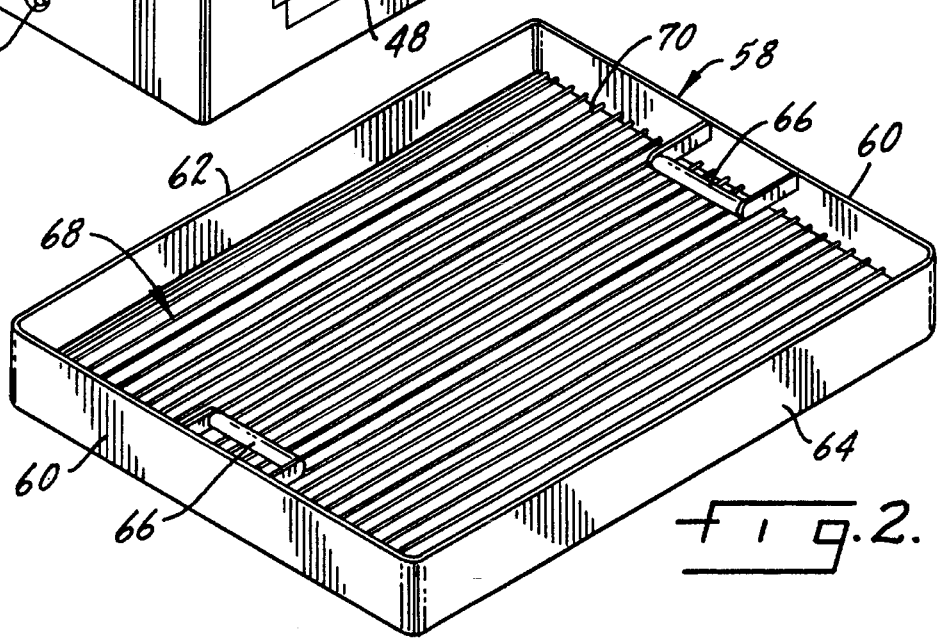
FIG. 2 is a perspective of the lift-out tray used in the cooler of FIG. 1.
Figure 3:
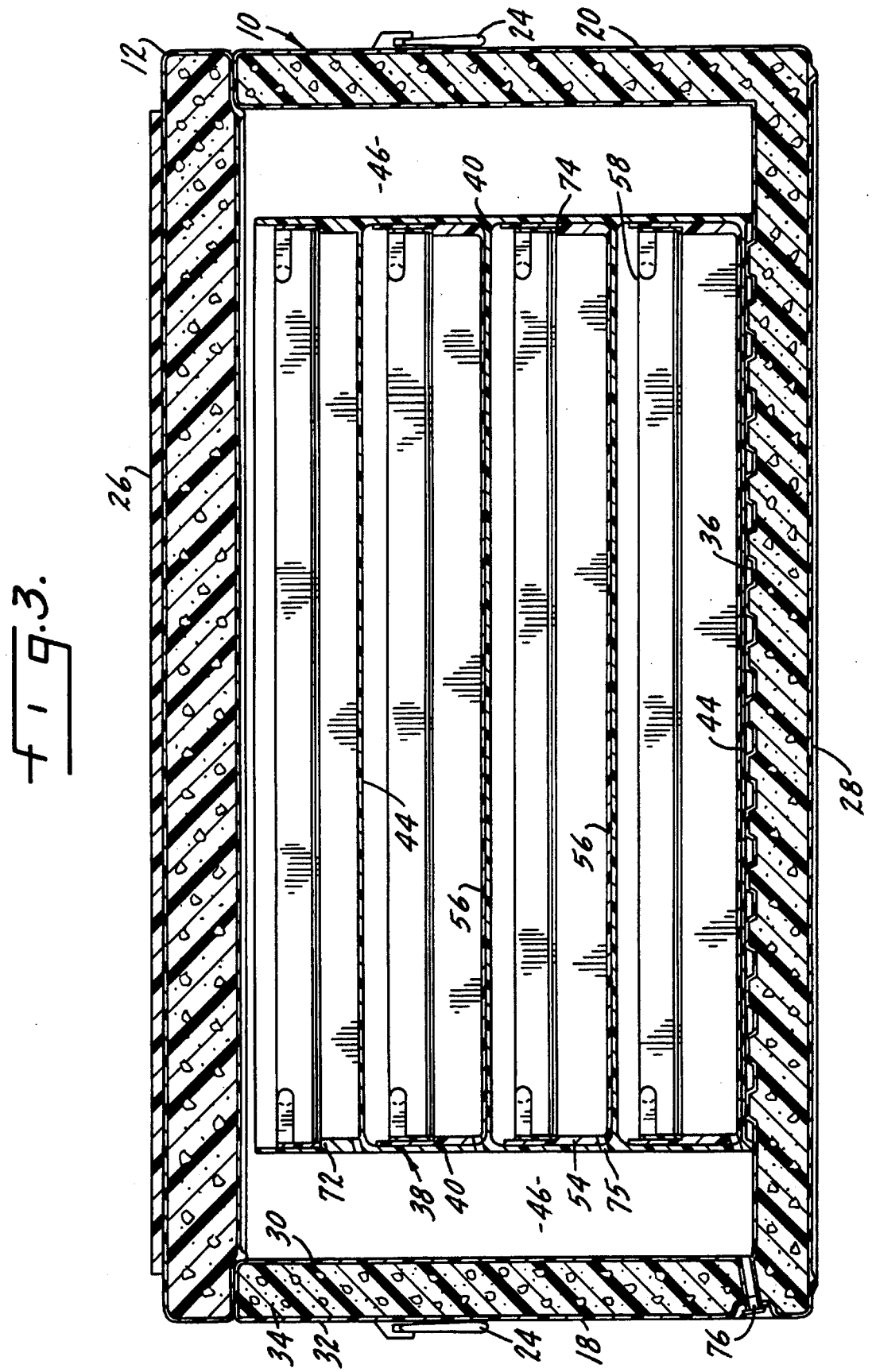
FIG. 3 is a vertical section through the cooler of FIG. 1.

Focusing on the embodiment of FIGS. 1, 2, and 3, which is particularly useful with fish bait such as is used on sport fishing boats for offshore fishing, the cooler includes a housing indicated generally at 10. There is a pivotal cover 12 connected by a hinge 14 to the rear wall 16 of the housing 10. The housing 10 includes side walls 18 and 20 and a front wall 22. There are handles 24 on each of the side walls 18 and 20 and there is a cutting board 26 mounted into the top of the cover 12.

As particularly shown in FIG. 3, each of the side walls 18 and 20, as well as the rear wall 16, front wall 22, and the bottom 28, is formed of a shell. Taking the side wall 18 as an example, and all of the above-described walls will be similarly constructed, the side wall 18 includes an inner wall member 30 and an outer wall member 32, with insulation 34 being positioned within the space defined between the walls 30 and 32. This is the preferred type of cooler in that each of the walls has a rigid exterior and a foam insulation interior. Other types of coolers in which the entire wall is formed of a foam insulation may also be satisfactory, although such are not subject to the same degree of wear and abuse as are coolers which have rigid walls. The bottom wall 28 is formed similar to that described above, except its upper surface 36 is corrugated for added strength.

Positioned within the interior of the housing 10 is a support 38 which includes side walls 40, a rear wall 42, and generally horizontally extending dividers 44. The support may be formed of a suitable rigid plastic and when positioned within the housing 10 as shown in FIGS. 1, 2, and 3, defines a three-sided space 46 for ice. There is a space between the rear wall 42 of the support and the rear wall 16 of the housing, and spaces between the side walls 40 of the support and the side walls 18 and 20 of the housing. This space will be filled with ice to cool the contents of what is stored within the support. The support insulates or isolates the ice from the material being cooled, keeping it cool but yet dry.

There are a plurality of drawers which extend out through the front of the housing 10 and are movably supported by the horizontal dividers 44. The drawers are indicated at 48 and each includes a front 50 with a handle 52, side wall 54, and a rear wall not shown. There is also a bottom 56 for each drawer. Each of the drawers 48 includes a lift-out tray shown particularly in FIG. 2 and indicated at 58. The trays 58 include side walls 60, a rear wall 62, and a front wall 64. There are handles 66 on each of the side walls and the bottom of each tray is formed by a grate 68 which is made up of a plurality of generally parallel thin gauge steel rods 70, each of which will extend into the sides 60 at their opposite ends. The trays 58 are lift-out trays. The material being cooled, for example fish bait or foodstuffs, will be positioned on the grate and there will be ice positioned within the drawers, beneath the grate and on the drawer bottoms 56. Thus, each drawer provides a small cooler in itself having ice therein, with the ice being spaced and isolated from the material being cooled.

In addition to the drawers 48 there is a lift-out tray 58 in the top of the support 38. The lift-out trays are all the same and in the case of the top of the support, there is a peripheral shoulder 72 which supports the top lift-out tray. Similarly, each of the drawer sides 60 has peripheral supports 74, similar to the supports 72. The drawers, as well as the lift-out tray, are substantially the same in that in each instance there is a removable tray having a grated bottom, with the tray being seated upon a peripheral support which forms a container for ice or other coolant material. There are drains 75 at the bottom edge of each drawer and through the support. This will prevent buildup of water from melting ice in the drawers.

The cooler of FIGS. 1 through 3 is completed by a drain 76 to empty the peripheral space between the support and the housing. There are conventional butterfly latches, indicated at 78, which will be used to hold the drawers in a latched or locked position within the housing until the latch is operated so that the drawer may be pulled out for access to its contents.

In the embodiment of FIGS. 4 and 5, the housing will be substantially the same as in the FIG. 1–3 embodiment. There is a three-sided space, indicated at 80 in FIG. 5, which will hold ice and which extends about three sides of a support 82. There are beverage container canisters 84 positioned within the space 80 and these may be used to hold wine or other types of beverages which will customarily be available in bottles. There is also a can space 86 defined between side walls 88 and 90 for use in cooling beverages in cans. There will be ice in the space 80 except for those areas used up by the beverage canisters and the can spaces 86 of which there are two.

The support 82 in the FIG. 4 and 5 embodiment is similar to the support 38 in that there are side walls 92, a rear wall 94, and a plurality of horizontally extending dividers 96. There are a plurality of drawers which will be accessible from the front of the container as in the FIG. 1–3 embodiment. These drawers will be similar in construction in that they may include lift-out trays with grated bottoms, with the space beneath the grate being for ice. The drawer shown particularly in the lower right-hand corner of FIG. 4 includes a grate 98 made up of wires 100, with there being a space 102 beneath the grate for containing ice. The grate may rest on a support ledge 103. The drawer adjacent the above-described drawer may include a wine rack-type bottom 104 for use in storing cooled bottles of wine or other beverages.

The embodiment of FIGS. 4 and 5 may have all of the drawers accessible through a side wall, or the top drawer may be accessible when the cover is open. All of the drawers may have lift-out trays, or only some of the drawers may have lift-out trays. The cooler of FIGS. 4 and 5 is more particularly designed for beverage and foodstuffs, although with the use of a grated tray it is clearly usable for fish bait which must be cooled, but stored away from the water which will result from melted ice.

All of the coolers shown herein provide a means for cooling, but yet keep the ice which is the cooling medium separated from the material being cooled. The separation is brought about by the use of a centrally positioned support which provides for at least a three-sided space for holding ice about the periphery of the support. In addition, the drawers or lift-out trays may have grated bottoms, with there being ice in the bottom of the drawer beneath the lift-out grate such that the ice may cool the material sitting upon the grate whether it be fish bait, food such as sandwiches, fruit, or the like.

Whereas the preferred form of the invention has been shown and described herein, it should be realized that there may be many modifications, substitutions and alterations thereto.

The embodiments of the invention in which an exclusive property or privilege is claimed are defined as follows:

1. A portable cooler including a housing having a bottom, side walls and a pivotal top hinged to one of the side walls, said bottom, side walls, and top being formed of an insulating material, a support having side walls positioned within said housing, a space for ice defined between a plurality of said support side walls and a plurality of said housing side walls, a plurality of drawers movable in said support and accessible from outside one of said housing side walls, each drawer including a front, side walls, and a bottom, at least one of said drawers having a grate supported on the drawer side walls above the drawer bottom, the space beneath the grate providing a container for ice to cool articles positioned on the grate, but spaced from the ice beneath the grate.

2. The cooler of claim 1 including a lift-out tray positioned in said support and accessible from the top of said housing when the pivotal top is open.

3. The cooler of claim 2 wherein said lift-out tray includes side walls and a grate supported by said side walls.

4. The cooler of claim 1 wherein each of said drawers has side walls, a front, and a bottom, a grate supported on the side walls above the door bottom for each drawer, with the space beneath each grate providing a container for ice.

5. The cooler of claim 4 wherein each drawer includes a lift-out tray, with said grate forming the bottom for each lift-out tray.

6. The cooler of claim 5 wherein each lift-out tray includes handles positioned at opposite sides thereof.

7. The cooler of claim 1 wherein said pivotal top includes a cutting board on the upper surface thereof.

8. The cooler of claim 1 including a plurality of beverage container canisters positioned within the space between said housing side walls and said support side walls.

9. The cooler of claim 8 wherein at least one of said drawers has beverage container supporting means therein.

10. The cooler of claim 1 wherein each of said side walls, top, and bottom of said housing include a generally rigid inner and outer cover, with insulation positioned within the cover.

11. The cooler of claim 10 wherein the inner cover of said housing bottom wall is corrugated to provide for added strength.

12. The cooler of claim 1 wherein said cooler is designed for use with fish bait, with the fish bait being seated upon the grate, cooled by the ice, but free from direct contact with the ice.

* * * * *